A. T. McCREARY.
HORSESHOE TOE CALK BAR.
APPLICATION FILED JUNE 20, 1907.
965,119.
Patented July 19, 1910.
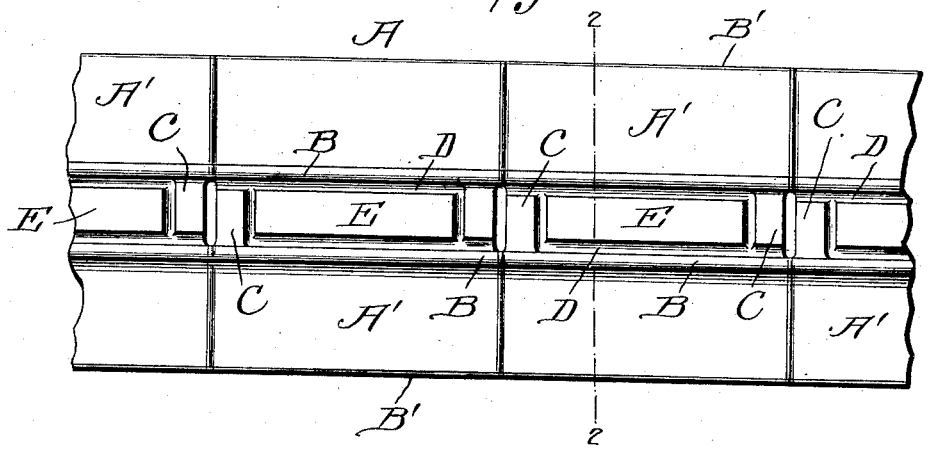
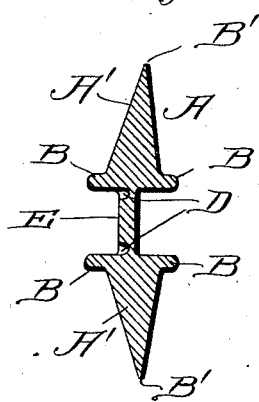
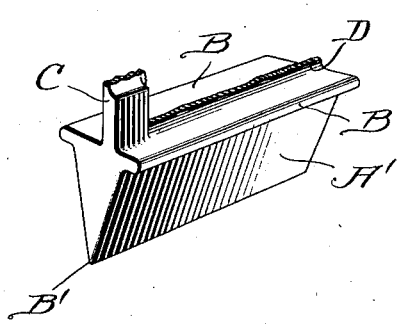
Inventor
A. T. McCreary,

UNITED STATES PATENT OFFICE.

ABRAM T. McCREARY, OF FORTYFORT, PENNSYLVANIA, ASSIGNOR OF ONE-HALF TO GEORGE PECK, OF FORTYFORT, PENNSYLVANIA.

HORSESHOE TOE-CALK BAR.

965,119.  Specification of Letters Patent.  Patented July 19, 1910.

Application filed June 20, 1907. Serial No. 379,952.

*To all whom it may concern:*

Be it known that I, ABRAM T. MCCREARY, a citizen of the United States, residing at Fortyfort, in the county of Luzerne and State of Pennsylvania, have invented a new and useful Improvement in a Horseshoe Toe-Calk Bar, of which the following is a specification.

This invention relates to a bar producing a horse shoe calk designed to be welded to the shoe and also to a calk formed by rolling steel, a number of calks being produced at one time and being cut from the bar and welded in place as needed.

The object of the invention is to produce a calk which can be quickly and readily welded in place and which can be manufactured with the minimum waste of material.

The invention consists in rolling a bar of steel in such a manner that a plurality of calks are formed from the bar separated from each other by lines of depression or grooves, two longitudinal ribs being formed parallel to each other upon the central portion of each side of the bar, said ribs forming welding flanges for the calks when the bar is cut, along the depressions above mentioned.

In the drawings forming a part of this specification:—Figure 1 is a plan view showing one face of the bar with the calks formed thereon. Fig. 2 is a transverse section through the bar upon the line 2—2 of Fig. 1. Fig. 3 is a detail perspective view of a single calk cut from the bar shown in Figs. 1 and 2.

In these drawings A represents a portion of one of the rolled bars showing in plan four of the calks A' and portions of four other calks. Each calk is provided along the sides of its base with flanges B, produced by forming two parallel ribs upon each side of the bar A. Spurs C are also formed upon the base of each calk and at one end thereof. The calks are separated from each other by grooves or depressions D formed in the space between the ribs or flanges B and upon one side of the bar A only, as shown in Figs. 1 and 2.

In forming calks in this manner the only material unused are small central strips E left between the grooves D. The calks having been formed by rolling they are detached from the bar for use by cutting along the grooves D, thus leaving the calk as shown in Fig. 3.

The calk is readily placed in position, the spurs C being driven into the shoe in order to hold the calk in place during the welding operation. The calk can be welded in any ordinary vise or by means of an iron plate provided with a slot sufficiently large to permit the calk to drop therein. In welding the spur is driven into the shoe and the shoe is then laid upon the vise or iron plate, if such a plate is used, the calk being downward and entering over the slot of the plate, the flanges B bearing upon sides of said slot, or if a vise is used, the flanges may bear upon the opposing jaws of the vise or may be gripped by said jaws. Held in this manner the welding operation is completed without any danger of dulling the sharpened cutting edge B' of the calk.

Having thus fully described my invention, what I claim as new and desire to secure by Letters Patent, is:—

A horseshoe calk bar comprising a connected series of calks, the bar being provided with two longitudinal flanges intermediate the edges and portions between the flanges designed to form spurs upon the individual calks when severed from the bar, said spur portions being alternately connected to opposite flanges, the bar being weakened adjacent the spur portions at one end thereof and also adjacent and lengthwise of the flanges.

ABRAM T. McCREARY.

Witnesses:
TILGHMAN GEISER,
JOHN GEISER.